July 20, 1943.   C. E. WALLING   2,324,608
CLAMPING FIXTURE FOR MACHINE TOOLS
Filed July 23, 1941
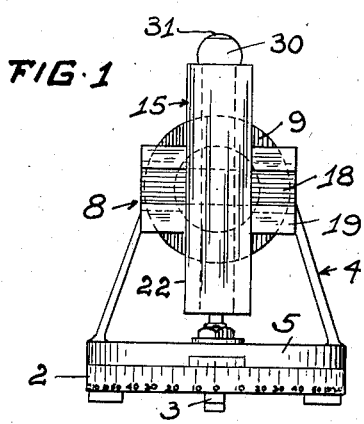
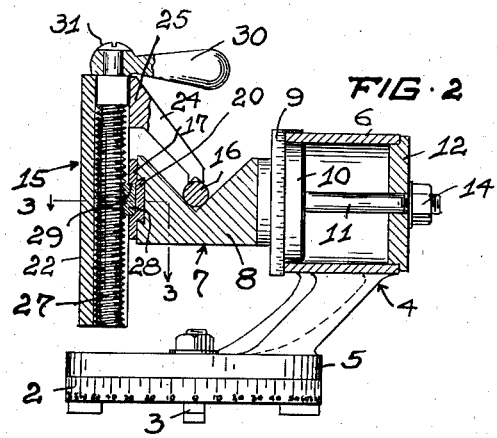
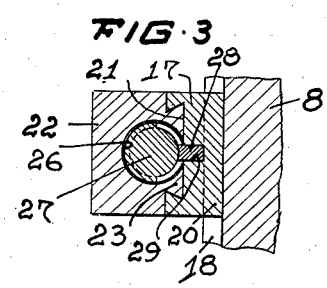
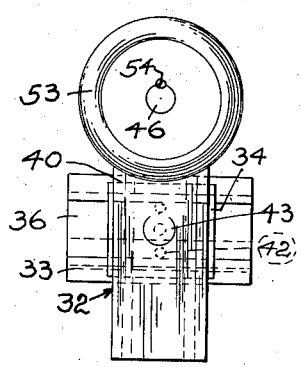
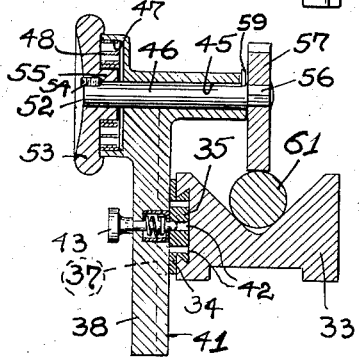
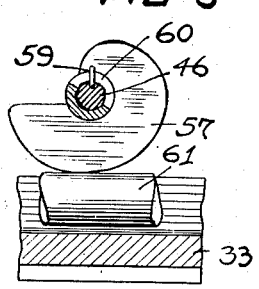
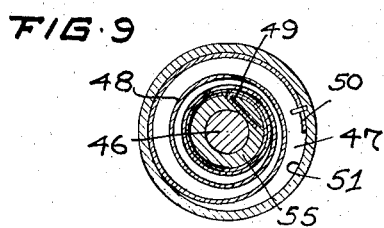
INVENTOR.
CLYDE E. WALLING
BY Gustav A. Wolff
ATT.

Patented July 20, 1943

2,324,608

UNITED STATES PATENT OFFICE 2,324,608

CLAMPING FIXTURE FOR MACHINE TOOLS

Clyde E. Walling, Cleveland, Ohio

Application July 23, 1941, Serial No. 403,742

2 Claims. (Cl. 51—220)

This invention is a continuation in part of my co-pending application Ser. No. 357,436 filed Sept. 19, 1940, and relates in general to improvements in fixtures for machine tools, and more particularly to improvements in clamping fixtures adapted to readily and easily clamp and hold work pieces and tools during grinding, drilling and similar operations.

The general object of the present invention is the provision of a readily adjustable clamping device for work pieces and tools, which clamping means embody a supporting base (a V-block, angle plate or any other one of presently used tool supporting elements) and clamping means mounted for vertical and horizontal adjustment on said supporting base and provided with a shiftable clamping portion for quick and proper clamping of a work piece or tool to said supporting base.

Another object of the invention is the provision of a readily adjustable clamping device of the type referred to above, in which the shiftable clamping portion includes a rotatably supported, spring actuated, cam-like clamping element for automatically effecting holding and clamping a work piece or tool in any desired position upon the supporting base.

A further object of the invention is the provision of a readily adjustable clamping device of the type referred to above, in which the shiftable clamping portion includes a rotatably supported spring actuated cam-like clamping element having a peripheral clamping surface shaped to a spiral of Archimedes with an angle less than the angle of friction of high grade tool steel to avoid lateral shifting by vertically exerted pressure on a work piece or tool when held by the clamping device.

In addition, the invention has certain other marked superiorities which radically distinguish it from presently known structures. These improvements or superiorities embodying certain novel features of construction, are clearly set forth in the following specification and the appended claims; and a preferred form of embodiment of the invention is hereinafter shown with reference to the accompanying drawing forming part of the specification.

In the drawing:

Fig. 1 is a front view of a universal head fixture with a work piece and tool clamping device constructed in accordance with this invention.

Fig. 2 is a view of the universal head fixture shown in Fig. 1 with the upper part of the fixture rotated 90° around its vertical axis and the clamping device and part of the fixture shown in section.

Fig. 3 is a fragmentary horizontal sectional view on line 3—3 of Fig. 2.

Fig. 4 is a perspective view of the nut block of the clamping device of the fixture.

Fig. 5 is a front view of another clamping device vertically and horizontally shiftably secured to a tool supporting element consisting of a V-block.

Fig. 6 is a sectional view through the clamping device shown in Fig. 5, the section being taken on line 6—6 of Fig. 5.

Fig. 7 is a side view of the clamping device shown in Figs. 5 and 6.

Fig. 8 is a sectional view on line 8—8 of Fig. 6; and

Fig. 9 a sectional view on line 9—9 of Fig. 6.

Referring now more in detail to the exemplified form of the invention shown in the drawing, reference numeral 2 denotes a circular base plate, the peripheral surface of which is graduated in degrees around its circumference. This base plate has extended through a central bore a T-bolt 3 to permit of proper location and clamping said base plate on a machine tool table. In addition, base plate 2 pivotally supports a bracket member 4 having a circular bottom plate 5 and a horizontally arranged cylindrical sleeve member 6. The bracket member 4 rests on base plate 2 and has extended through a central bore in bottom plate 5 the T-bolts 3, thus permitting rotation and proper setting of the bracket member. The axes of sleeve member 6 and base plate 2 intersect each other and the sleeve member 6 pivotally supports a work supporting element 7 in the form of a V-shaped block 8. This block carries at one side a cylindrical, circumferentially graduated extension 9 provided with a reduced circular end 10 extended into sleeve member 6 for rotatably supporting block 8 in said sleeve member. A threaded tie rod 11 in conjunction with a cover 12 and a nut member 14 prevent axial shifting of block 8 and permit free rotation of said block.

V-block 8 carries at its other side a clamping member 15 adapted to secure the arbor or cutter shank 16 of a tool in the V of the block. This clamping member by means of a slide block 17 is horizontally slidably mounted in a dove-tailed groove 18 in side 19 of V-block 8. Slide block 17 engages with its dove-tailed rib 20 the groove 18 and is provided with a vertically arranged dove-tailed groove 21 which carries vertically slidably a vertical post 22 engaging with its dove-tailed rib 23 groove 21. Vertical post 22, which mounts a clamping finger 24, having its upper portion 25 grooved and slidably engaged with dove-tailed rib 23, is longitudinally perforated and has extended through its bore 26 a threaded member 27 co-operating with a threaded block 28 which is extended into a recess 29 in slide block 17. This threaded block embodies threads 30 at its face portion opposite the threaded member 27 and these threads engage with the threads of member 27 to effect shifting of vertical post 22 when member 27 is rotated. A handle 30, secured to the top end of member 27 by means of a screw 31, permits of rotation of said member to shift clamping finger 24 toward shank 16 of a tool mounted in V-block 8. During such clamping operations, the finger 24 automatically shifts slide block 17 into frictional locking engagement with the upper side of dove-tailed horizontal groove 18 in V-block 8 and effects automatic locking of said slide block against lateral movements in groove 18.

The clamping member 32, shown in Figs. 5 through 9, is also vertically and horizontally shiftably connected with a V-block 33 by means of a slide block 34. This slide block engages with its horizontal, dove-tailed rib 35 a horizontal, dove-tailed groove 36 in V-block 33 and is provided with a dove-tailed vertical groove 37 for slidably mounting extension 38 on the lower portion 39 on body 40 of the clamping member 32, a vertical, dove-tailed rib 41 on extension 38 serving such a purpose. Slide block 34, in addition, is provided with a plurality of bores 42 co-operating with a spring pressed plunger 43 in extension 38 to permit quick rough vertical adjustment of clamping member 32 with respect to V-block 33. The upper portion of body 40 is rearwardly extended and perforated as at 45 to provide a bearing for a shaft 46 rotatably mounted in said bearing and, furthermore, forwardly extended, enlarged and recessed to form a cylindrical chamber 47 mounting a coil spring 48. This coil spring has its opposite ends 49 and 50 secured to wall 51 of chamber 47 and to shaft 46 to effect automatic rotation of shaft 46 in an anti-clockwise rotation, as will best be understood from an inspection of Figs. 8 and 9. To that effect, shaft 46 mounts at its front end 52 an operating hand wheel 53 attached to said shaft by means of a screw member 54, which hand wheel embodies a slotted hub 55 extended into chamber 47 for cooperating with the hook-shaped end 49 of coil spring 48. Preferably, as shown, the rear face of wheel 53 is slightly recessed to fully close chamber 47. The shaft 46 mounts at its rear end 56 a cam member 57 having a peripheral surface 58 with substantially the shape of a spiral of Archimedes. The angle of this spiral is less than the angle of repose or friction of high grade tool steel to insure proper gripping of a work piece or tool under all conditions. Preferably, shaft 46 carries near cam member 57 a pin 59 arranged in a half circumferential recess 60 in the rear extension of body 40 for limiting the rotary movement of shaft 46 and permitting of pretensioning of coil spring 48.

In operation, cam member 57 of clamping member 32, after the latter has been laterally and vertically adjusted to proper position, will automatically frictionally engage the tool or work piece 61 in the V of block 33 and hold such tool or work piece rigidly in proper position without additional clamping means, due to the fact that the friction angle of the material or tool is larger than the angle of the spiral surface of cam member 57.

Having thus described my invention,

What I claim is:

1. A clamping fixture for machine tools comprising a V-shaped base member, a slide member horizontally slidably connected to one side of said base member, a bracket vertically adjustably mounted in said slide member, a rotatable clamping cam of spiral peripheral surface mounted on said bracket and arranged above the apex of the V of said V-shaped base member, and a spring means for automatically rotating said clamping cam into clamping position.

2. A clamping fixture for machine tools comprising a V-shaped base member, a slide member horizontally slidably connected to one side of said base member, a bracket vertically adjustably mounted in said slide member, means on said bracket and said slide member for securing said bracket and slide member in adjusted positions to each other, a rotatable clamping cam of spiral peripheral surface laterally extended from said bracket so as to extend above the apex of the V of said V-shaped base member, and spring means for automatically rotating said clamping cam into clamping position.

CLYDE E. WALLING.